(12) United States Patent
Hirose

(10) Patent No.: US 7,913,596 B2
(45) Date of Patent: Mar. 29, 2011

(54) TURRET TOOL REST AND MACHINE TOOL

(75) Inventor: Michiharu Hirose, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 264 days.

(21) Appl. No.: 12/029,761

(22) Filed: Feb. 12, 2008

(65) Prior Publication Data

US 2008/0202297 A1 Aug. 28, 2008

(30) Foreign Application Priority Data

Feb. 26, 2007 (JP) ................................. 2007-045952

(51) Int. Cl.
*B23B 29/24* (2006.01)
(52) U.S. Cl. .............................. 82/121; 82/159; 29/27 C
(58) Field of Classification Search .................... 82/120, 82/121, 124, 129; 29/37 R, 37 A, 38 R, 38 A, 29/38 B, 38 C, 38 D, 38 E, 38 F, 27 C; *B23B 29/24*
See application file for complete search history.

(56) References Cited

U.S. PATENT DOCUMENTS

| | | | | |
|---|---|---|---|---|
| 3,691,879 A * | 9/1972 | Blake | ............................. | 82/127 |
| 3,821,835 A * | 7/1974 | St. Andre et al. | ................. | 29/36 |
| 3,955,257 A * | 5/1976 | Herbst et al. | ..................... | 29/36 |
| 4,006,518 A * | 2/1977 | Rudolph et al. | ................... | 29/39 |
| 4,080,853 A * | 3/1978 | Goto | ............................... | 82/120 |
| 4,180,894 A * | 1/1980 | Link | ................................. | 29/36 |
| 4,413,539 A * | 11/1983 | Ishizuka et al. | ................. | 82/120 |
| 4,597,155 A * | 7/1986 | Garnett et al. | .................. | 29/564 |
| 4,843,691 A * | 7/1989 | Hafla et al. | ....................... | 29/36 |
| 5,020,402 A * | 6/1991 | Link et al. | ....................... | 82/124 |
| 5,239,901 A * | 8/1993 | Lin | ................................. | 82/119 |
| 5,282,300 A * | 2/1994 | Girny et al. | ................... | 29/27 C |
| 5,299,476 A * | 4/1994 | Tommasini et al. | ............ | 82/122 |
| 5,765,455 A * | 6/1998 | Muhlnickel | .................... | 82/1.11 |
| 5,832,590 A * | 11/1998 | Wuerthner | ...................... | 29/563 |
| 5,964,016 A * | 10/1999 | Ito et al. | ........................ | 29/27 C |
| 6,185,818 B1 * | 2/2001 | Ito et al. | ....................... | 29/889.7 |
| 6,715,386 B2 * | 4/2004 | Maier | ............................ | 82/1.11 |
| 7,131,359 B2 * | 11/2006 | Trautmann | ..................... | 82/124 |

FOREIGN PATENT DOCUMENTS

| | | | |
|---|---|---|---|
| JP | 06-009841 U1 | | 2/1994 |
| JP | 2001225205 A | * | 8/2001 |
| JP | 2003-266268 A1 | | 9/2003 |

\* cited by examiner

*Primary Examiner* — Boyer D. Ashley
*Assistant Examiner* — Sara Addisu
(74) *Attorney, Agent, or Firm* — Burr & Brown

(57) ABSTRACT

A turret tool rest is provided with a tool rest body, which is rotatable around the vertical axis, on a lower saddle. A turret is provided on a side surface of the tool rest body, and an anti-vibration mechanism is provided on a side surface that is adjacent to the side surface at a right angle. Indexing can be performed by selecting from the turret and the anti-vibration mechanism by rotation of the tool rest body.

5 Claims, 4 Drawing Sheets

TURRET TOOL REST AND MACHINE TOOL

BACKGROUND OF THE INVENTION

This application claims the benefit of Japanese Patent Application Number 2007-045952 filed on Feb. 26, 2007, the entirety of which is incorporated by reference.

FIELD OF THE INVENTION

The present invention relates to a turret tool rest provided in a machine tool such as a lathe, and a machine tool using the turret tool rest.

Conventionally, a lathe in which a tool rest is provided on one side while an anti-vibration mechanism for a workpiece is provided on the other side of a workpiece supported between a headstock and a tailstock on a bed has been known as described in Patent Document 1. In the lathe, the tool rest and the anti-vibration mechanism are movable in the Z-axis and X-axis directions.

Another conventional lathe has a turret on a tool rest and a turning tool is provided on the tool rest as described in Patent Document 2. In this lathe, an anti-chatter member corresponding to anti-vibration mechanism having a workpiece pressing member, which comes into contact with the outer peripheral surface of a workpiece, at the tip end thereof is provided on the holding member for the turning tool. FIGS. 3 and 4 show a turret tool rest provided with the above-mentioned conventional anti-vibration mechanism. Reference numeral 20 denotes a turret on which a plurality of tools 21, 21 . . . is mounted in a radial form, which is provided on a tool rest body (not shown), and is rotated and indexed. Reference numeral 22 denotes an anti-vibration mechanism provided on the turret 20. The anti-vibration mechanism 22 is configured so as to support a workpiece by opening and closing a pair of arms 23, 23 each provided with a roller 24 at the tip end thereof.

[Patent Document 1] Japanese Unexamined Utility Model Application Publication No. 6-9841

[Patent Document 2] Japanese Unexamined Patent Application Publication No. 2003-266268

In the case where the anti-vibration mechanism 22 is provided on the turret 20, when the range of a machining workpiece is extended by means of a large anti-vibration mechanism 22 as shown in FIG. 3, a tool adjacent to the large anti-vibration mechanism 22 cannot be mounted on the turret 20. As a result, the number of tools capable of being mounted on the turret 20 is limited. Further, since swivel diameter in a machine tool is usually limited as indicated by the two-dot chain line in FIG. 3, a problem that the anti-vibration mechanism 22 exceeding this swivel diameter cannot be used also arises. Even if the anti-vibration mechanism 22 is made small within the range where the adjacent tool 21 is mounted as shown in FIG. 4, when machining is performed by means of the adjacent tool 21, the diameter of workpiece is limited so as to not interfere with the anti-vibration mechanism 22 as indicated by the two-dot chain line.

SUMMARY OF THE INVENTION

Accordingly, an object of the present invention is to provide a turret tool rest having an anti-vibration mechanism, which can be used without interference between a turret and the anti-vibration mechanism and without the limitation of the size of the anti-vibration mechanism and the number of tools on the turret side, and a machine tool.

To achieve the above object, a first aspect of the present invention is a turret tool rest having a turret on which a tool is mounted. The turret tool rest is provided on a tool rest body which is provided on a bed of a machine tool. The tool rest body is rotatable around the vertical axis, and the turret is provided on one side surface of the tool rest body and an anti-vibration mechanism is provided on the other side surface thereof. Indexing can be performed by selecting of the turret or the anti-vibration mechanism by the rotation of the tool rest body.

A second aspect of the present invention is, in addition to the object of the first aspect, a tool rest where two side surfaces are formed on the tool rest body in the vertical direction that are adjacent to each other at a right angle in a plain view, and the turret is provided on one of the two side surfaces and the anti-vibration mechanism is provided on the other side.

Further, to achieve the above object, a third aspect of the present invention is a machine tool where a plurality of tool rests including at least one turret tool rest of the first and second aspects are provided on a bed, wherein it can be selected from a case where the turret tool rest is used as a tool rest to index a turret to the workpiece side to machine the workpiece and a case where turret tool rest is used as an anti-vibration means for the workpiece machined by another tool rest by indexing an anti-vibration mechanism to the workpiece side.

According to the first and third aspects of the invention, the turret and the anti-vibration mechanism can be used without interference with each other on one turret tool rest. Therefore, the size of the anti-vibration mechanism is not limited, while on the turret side the number of tools and the size of the largest machineable workpiece are not limited. Further, since it is not necessary to exchange the setup, any loss of work does not occur.

According to the second aspect of the present invention, in addition to the effect of the first aspect, indexing of the turret and the anti-vibration mechanism can be performed rapidly in a short period of time.

DESCRIPTION OF THE PREFERRED EMBODIMENTS

Figure 1A:
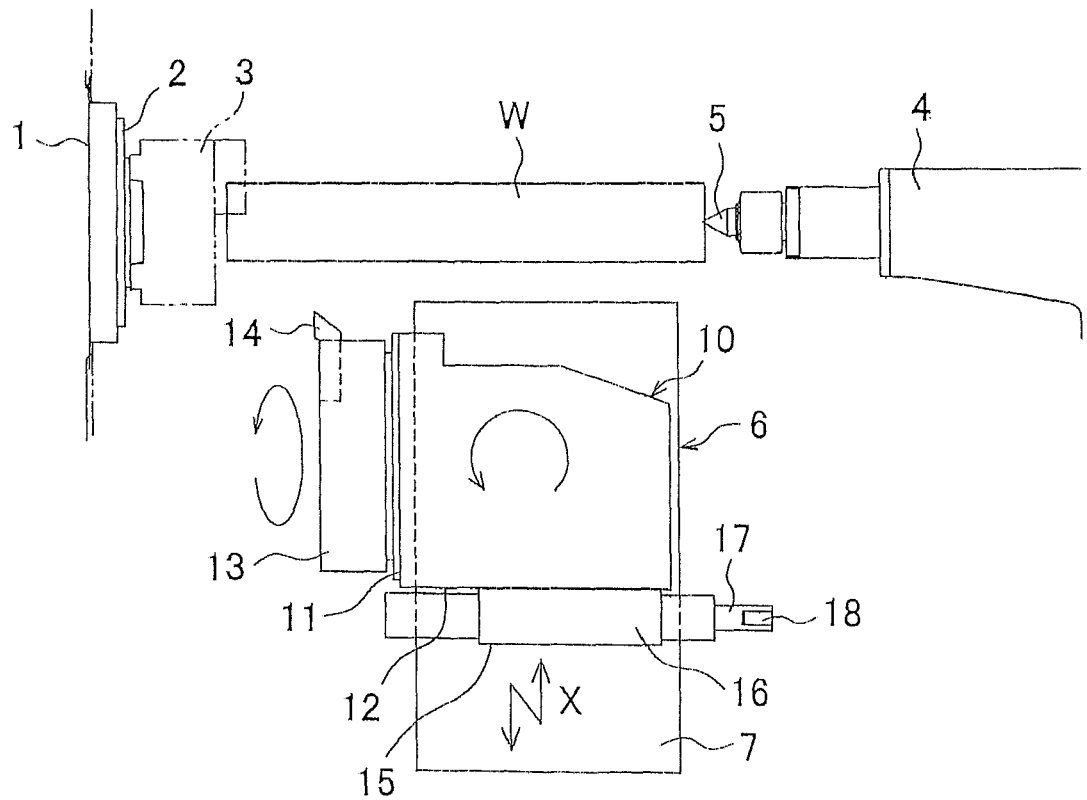
FIG. 1A is a partial plain view of a lathe using a turret tool rest in accordance with an embodiment of the present invention.

Reference numeral 6 denotes a turret tool rest where an intermediate rest 8 and a block-shaped tool rest body 10 are provided. The intermediate rest 8 is provided on a lower saddle 7 movable in the Z-axis and X-axis directions, and the block-shaped tool rest body 10 is provided on the intermediate rest 8 via a Carbic coupling 9 so as to be rotatable and capable of indexing around the vertical axis. The tool rest body 10 has two vertical surfaces that are adjacent to each other at a right angle in a plain view. On one side surface 11 of the tool rest body 10, a turret 13 mounted with a tool 14 is provided so as to be rotatable and capable of indexing, and on the other surface 12, an anti-vibration mechanism 15 is provided.

The anti-vibration mechanism 15 is configured so that a pair of arms 17, 17 each having a roller 18 at the tip end thereof are projectingly provided at the side of a body 16 which is fixed to the side surface 12 of the tool rest body 10. The pair of arms 17, 17 can be opened and closed by an actuator (not shown), provided in the body 16.

At the opposite side facing to the turret tool rest 6, another tool rest (not shown) which is movable in the Z-axis and X-axis directions similarly and has only a turret on the bed over the workpiece W.

In the lathe configured as described above, it can be selected from the turret 13 and the anti-vibration mechanism 15 to use, by rotation of the tool rest body 10 of the turret tool rest 6 as explained below.

Figure 1B:
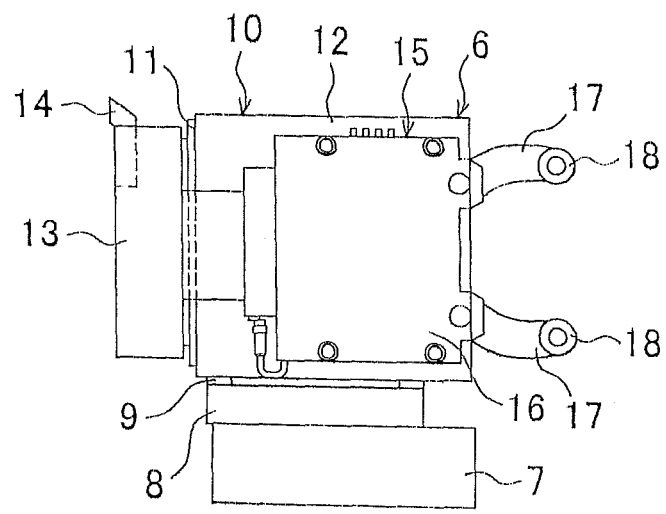
FIG. 1B is a side view of the turret tool rest shown in FIG. 1A.

First, in the case where the turret 13 is selected to be used, the tool rest body 10 is rotated so that the side surface 11 is parallel with the X axis as shown in FIG. 1. At this position, the tool 14 of the turret 13 faces to the workpiece W side. Thereby, the workpiece W is fed by the feed control in the X-axis direction of the lower saddle 7 and turn-processed.

Figure 2:
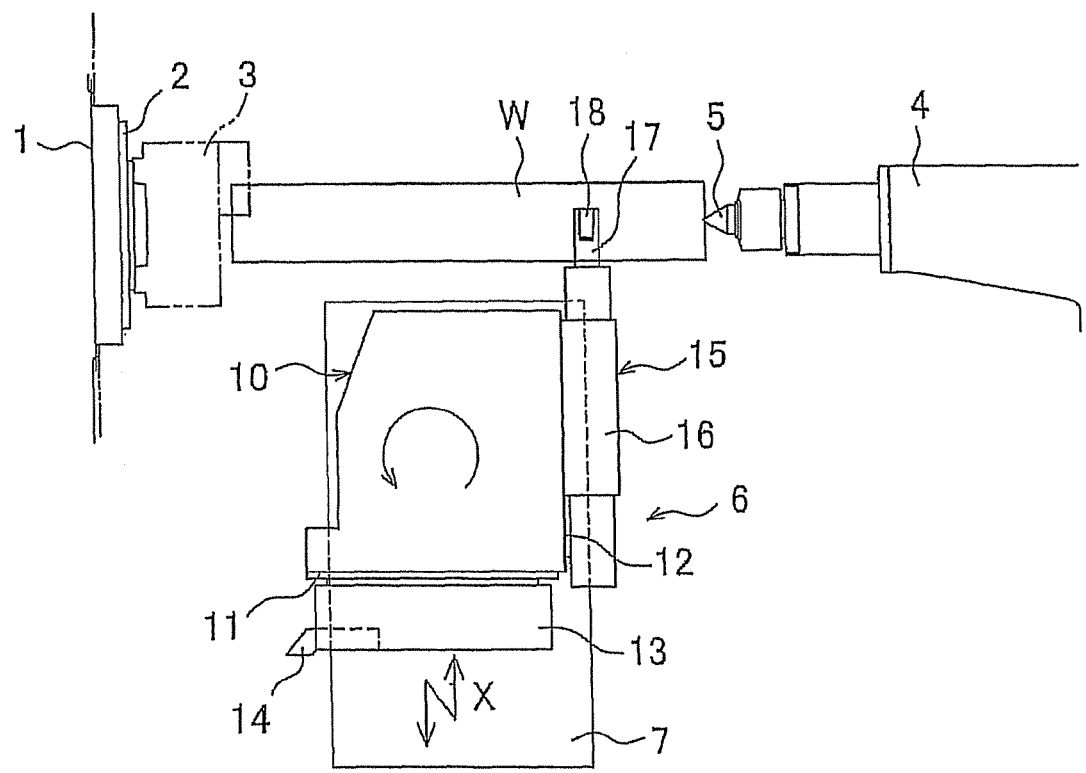
FIG. 2 is a partial plain view of a lathe, showing a state in which an anti-vibration mechanism is used.
Figure 3:
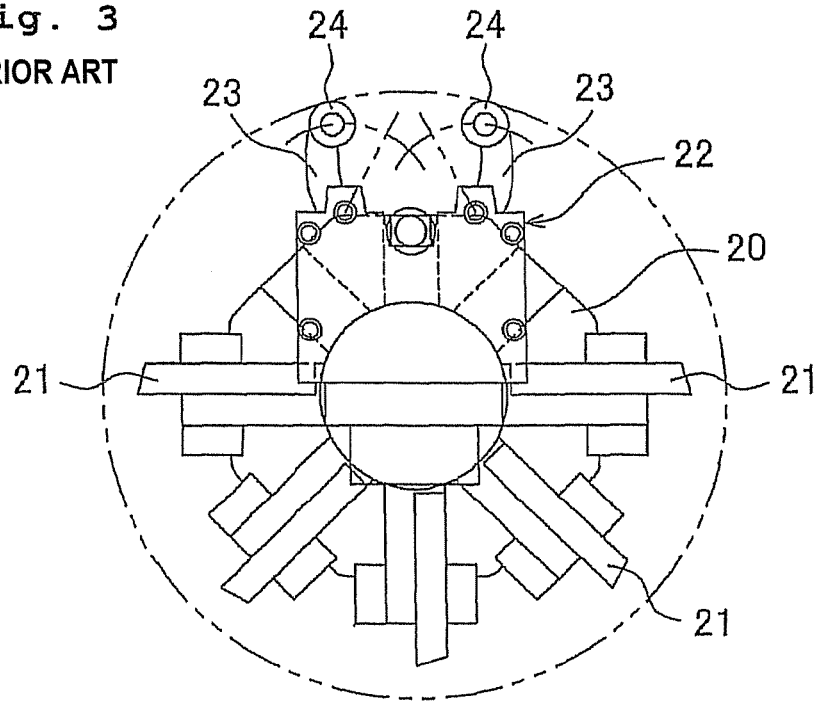
FIG. 3 is an explanatory view of a conventional turret tool rest.
Figure 4:
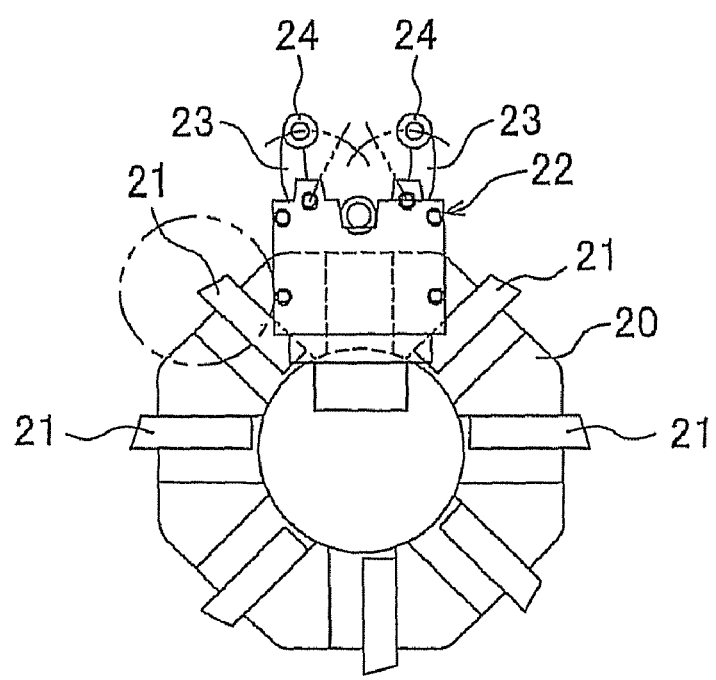
FIG. 4 is an explanatory view of a conventional turret tool rest.
Figure 5:
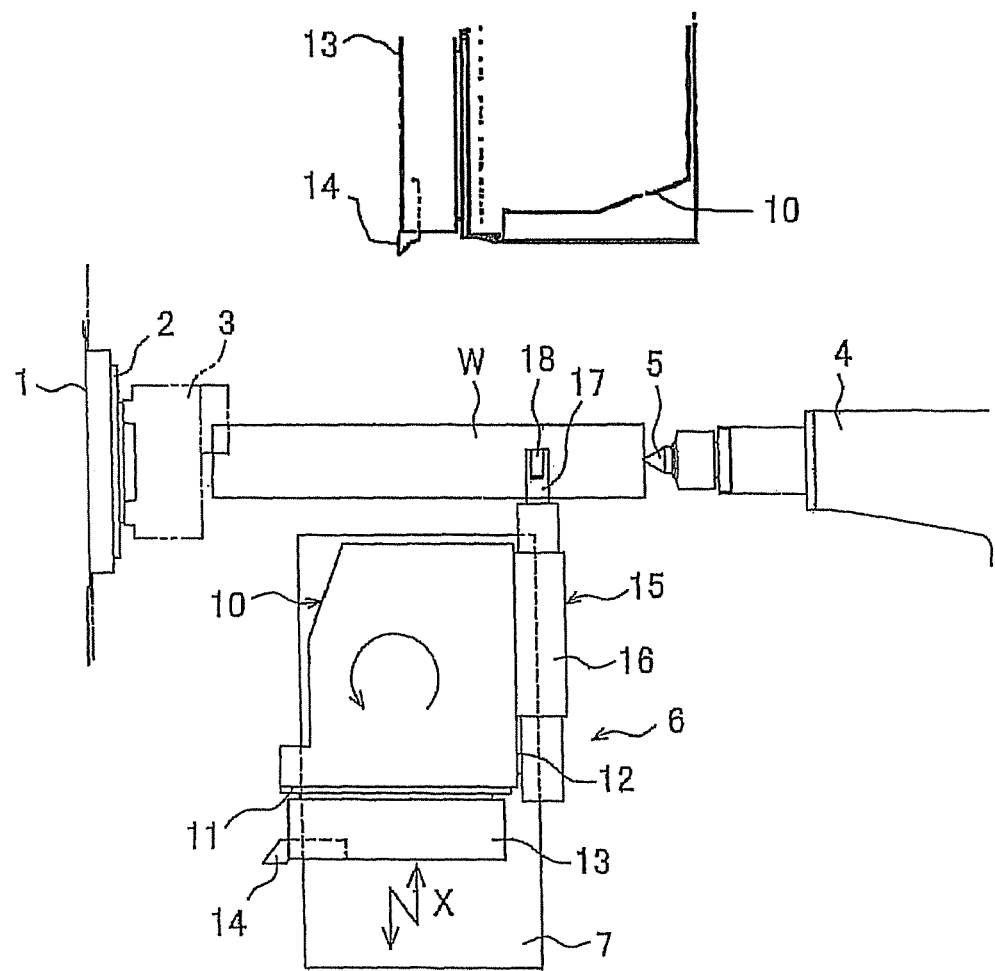
FIG. 5 is an explanatory view of one turret tool rest machining a workpiece with a second turret tool rest supporting the workpiece with the anti-vibration mechanism.

On the other hand, in the case where the anti-vibration mechanism 15 is selected, the tool rest body 10 is rotated so that the side surface 12 is parallel with the X axis as shown in FIG. 2. At this position, the arms 17, 17 face to the workpiece W side. Thereby, the workpiece W is fed by the feed control in the X-axis direction of the lower saddle 7 and is supported by the opening/closing control of the arms 17, 17. In this case, the workpiece W is turn-processed by the turret of another tool rest while being supported by the anti-vibration mechanism of the first turret tool rest, as shown in FIG. 5.

According to the turret tool rest 6 and the lathe configured as described above, the tool rest body 10 is rotatable around the vertical axis, and the turret 13 is provided on the side surface 11 of the tool rest body 10, while the anti-vibration mechanism 15 is provided on the side surface 12 thereof. Thus, indexing can be performed by selecting from the turret 13 and the anti-vibration mechanism 15. Thereby, the turret 13 and the anti-vibration mechanism 15 can be used on one turret tool rest 6 without interference with each other. As a result, the size of the arm 17 is not limited on the anti-vibration mechanism 15 side, while the number of tools and the size of the largest machineable workpiece are not limited on the turret 13 side. Further, since it is not necessary to exchange the setup, any loss of work does not occur.

Particularly, in this embodiment, the tool rest body 10 has two side surfaces 11 and 12 in the vertical direction that are adjacent to each other at a right angle in the plain view, and the turret 13 is provided on one of the two side surfaces while the anti-vibration mechanism 15 is provided on the other thereof. Therefore, the indexing of the turret 13 as well as the anti-vibration mechanism 15 can be performed rapidly in a short period of time.

Although the turret and the anti-vibration mechanism are provided on each of the two side surfaces respectively at a right angle in the above-described embodiment, the angle between the two side surfaces may be an obtuse angle or an acute angle, not being limited to a right angle. Also, the configuration is not limited to one such that the turret and the anti-vibration mechanism are provided on the adjacent two side surfaces. For example, the configuration may be such that the two side surfaces are parallel with and not adjacent to each other and the turret is provided on one of the surfaces while the anti-vibration mechanism is provided on the other thereof.

Further, the configurations of the turret and the anti-vibration mechanism are not limited to the above-described ones. For example, the configuration of the anti-vibration mechanism can be changed appropriately such that the rollers are provided at a predetermined interval at a front end of a plate body as in the aforementioned Patent Document 1, or may be configured so that a roller is additionally provided at an intermediate position of the paired rollers to support the workpiece by three points.

In addition, in the case where the present invention is applied to a machine whose bed top surface tilts, which is a so-called slant-bed machine tool, the rotation axis of the tool rest body can be provided perpendicularly to the bed top surface.

Further, the configuration is not limited to one in which one set of the turret and the anti-vibration mechanism is provided. For example, the tool rest body may be a polygonal shape in a plain view, and a plurality of turrets and a plurality of anti-vibration mechanisms each capable of holding a different range of workpiece are attached to the each side surface of the tool rest body, so that indexing is performed by selecting from them according to the workpiece diameter etc.

In addition, in the lathe of the above-described embodiment, the turret tool rest is provided on one side while another tool rest is provided on the other side over the workplace. However, the turret tool rest in accordance with the present invention may be provided at both sides, so that the turret or the anti-vibration mechanism is selected at both sides. In this case, the changeover between the turning process side and the anti-vibration support side with respect to the workpiece can be accomplished easily. Needless to say, the present invention can be applied to other machine tools, not limited to a lathe.

What is claimed is:

1. A turret tool rest comprising:
    a tool rest body provided on a bed of a machine tool which is rotatable around the vertical axis; and
    a turret provided on the tool rest body, on which a tool is mounted;
    wherein the turret is provided on one side surface of the tool rest body while an anti-vibration mechanism is provided on another side surface thereof, and
    wherein indexing is performed by selecting from the turret and the anti-vibration mechanism by rotation of the tool rest body.

2. The turret tool rest according to claim 1, wherein two side surfaces are formed on the tool rest body in the vertical direction that are adjacent to each other at a right angle in a plain view, and the turret is provided on one of the two side surfaces while the anti-vibration mechanism is provided on the other side surface.

3. A machine tool comprising a plurality of tool rests including at least one turret tool rest comprising:
    a turret tool rest body provided on a bed of the machine tool which is rotatable around the vertical axis; and
    a turret provided on the turret tool rest body, on which a tool is mounted;
    wherein the turret is provided on one side surface of the turret tool rest body while an anti-vibration mechanism is provided on another side surface thereof,
    wherein indexing is performed by selecting from the turret and the anti-vibration mechanism by rotation of the turret tool rest body, and
    wherein a selection can be made from a case where the turret tool rest is used as a tool rest to index a turret to the workpiece side to machine the workpiece and a case where turret tool rest is used as an anti-vibration means for the workpiece that is machined by another tool rest by indexing an anti-vibration mechanism to the workpiece side.

4. A machine tool comprising a plurality of tool rests including at least one turret tool rest comprising:
   a turret tool rest body provided on a bed of the machine tool which is rotatable around the vertical axis; and
   a turret provided on the turret tool rest body, on which a tool is mounted;
   wherein the turret is provided on one side surface of the turret tool rest body while an anti-vibration mechanism is provided on another side surface thereof,
   wherein indexing is performed by selecting from the turret and the anti-vibration mechanism by rotation of the turret tool rest body,
   wherein two side surfaces are formed on the tool rest body in the vertical direction that are adjacent to each other at a right angle in a plain view, and the turret is provided on one of the two side surfaces while the anti-vibration mechanism is provided on the other side surface, and
   wherein a selection can be made from a case where the turret tool rest is used as a tool rest to index a turret to the workpiece side to machine the workpiece and a case where turret tool rest is used as an anti-vibration means for the workpiece that is machined by another tool rest by indexing an anti-vibration mechanism to the workpiece side.

5. A turret tool rest comprising:
   a tool rest body provided on a bed of a machine tool which is rotatable around the vertical axis;
   a turret, on which a tool is mounted, said turret being provided directly on one side surface of the tool rest body; and
   an anti-vibration mechanism provided directly on another side surface of the tool rest body,
   wherein indexing can be performed by selecting from the turret and the anti-vibration mechanism by rotation of the tool rest body.

* * * * *